(12) United States Patent
Xia et al.

(10) Patent No.: US 6,455,116 B1
(45) Date of Patent: Sep. 24, 2002

(54) POLY(HYDROXY AMINO ETHER) COMPOSITION, METHOD FOR PREPARING THE SAME AND ARTICLES PREPARED THEREFROM

(75) Inventors: Guang-Ming Xia; John M. Beckerdite; Wendy D. Hoenig, all of Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/953,311

(22) Filed: Sep. 14, 2001

(51) Int. Cl.[7] ............... C07C 215/06; C07C 217/42
(52) U.S. Cl. ............... 428/36.6; 428/36.7; 428/35.4; 428/412; 428/413; 428/480; 428/516; 428/523; 528/97; 528/99; 528/104; 528/111; 528/118; 528/102; 528/109; 528/121; 528/124; 564/504; 564/505

(58) Field of Search ............... 428/36.6, 36.7, 428/35.4, 412, 413, 480, 516, 523; 528/97, 99, 104, 111, 118, 102, 109, 121, 124; 564/504, 505

(56) References Cited

U.S. PATENT DOCUMENTS

| | | |
|---|---|---|
| 4,507,461 A | 3/1985 | Bowditch |
| 5,275,853 A | 1/1994 | Silvis et al. |
| 5,786,514 A | 7/1998 | Shen et al. |
| 6,111,146 A | 8/2000 | Rayborn |

Primary Examiner—Brian J. Davis
(74) Attorney, Agent, or Firm—Nemia C. Damocles

(57) ABSTRACT

A composition comprising a poly(hydroxy aminoether) and an effective amount of a propoxylated or ethoxylated phenol, process for preparing the same and articles prepared from the composition.

9 Claims, 1 Drawing Sheet

DMS data on BLOX resin/SYNFAC 8031 Blends
Viscosity as a Function of Shear Rate at 160°C Viscosity of Resin Blends vs. Shear Rate

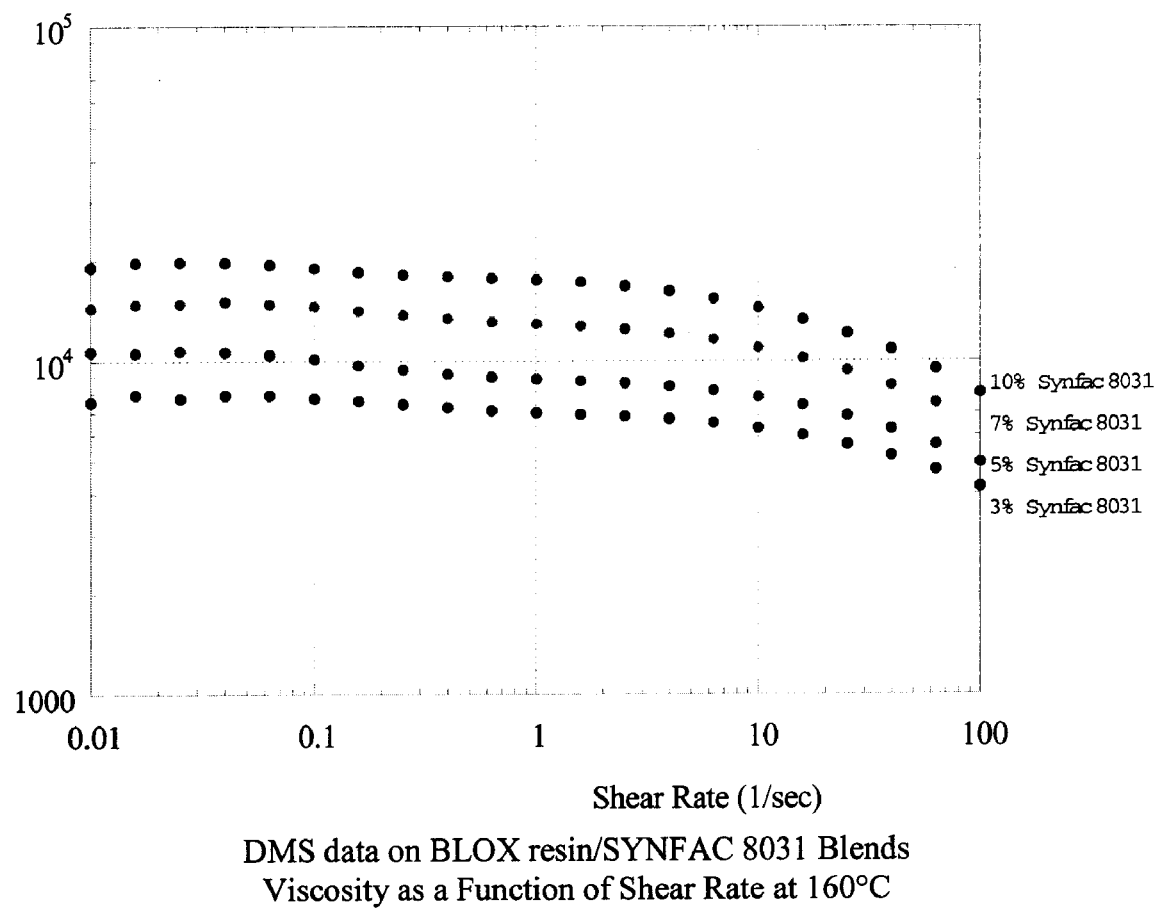
FIGURE 1 Viscosity of Resin Blends vs. Shear Rate

POLY(HYDROXY AMINO ETHER) COMPOSITION, METHOD FOR PREPARING THE SAME AND ARTICLES PREPARED THEREFROM

BACKGROUND OF THE INVENTION

The present invention relates to compositions comprising hydroxy-functionalized poly (amino ethers) or poly(hydroxy amino ethers) (PHAE), method for preparing the same and articles prepared therefrom.

Poly(hydroxy amino ethers) exhibit the property of good adhesion to a variety of substrates under conditions that allow the resin to melt and flow. However, quite often, the process demands that the resin softens and flows at low temperatures, with short heating time and without any external force to aid the softening and flow. Esters of carboxylic acids, among the most widely used modifiers to meet these challenges, undergo transesterifcation with polyhydroxy (amino ethers) at elevated temperatures. This not only makes it difficult to incorporate the ester modifier into the polyhydroxy (amino ether), but also changes the thermal stability of the modified polyhydroxy (amino ether). Poly (ethylene glycol) with molecular weight less than 5000 g/mole depresses the glass transition temperatures of the modified polyhydroxy (amino ether) and at the same time increases the water sensitivity of the modified resin. The combined effects of the low glass transition temperature and the plasticizing effect of absorbed moisture pose obstacles in fiber manufacturing using low molecular weight poly (ethylene glycol-modified polyhydroxy (amino ether). Poly (propylene glycol) does not render moisture sensitivity to resins modified with it, but it is not miscible with the polyhydroxy (amino ether).

Therefore, there is a need for a method for preparing a polyhydroxy (amino ether) composition which improves its adhesion to substrates and retains its processability, but does not increase its water absorptivity.

This need is met by the present invention which provides such a method.

SUMMARY OF THE INVENTION

In a first aspect, the present invention is a method for preparing a composition comprising a poly(hydroxy amino ether) (PHAE) and a propoxylated or ethoxylated phenol which comprises adding to the PHAE an effective amount of propoxylated or ethoxylated phenol.

In a second aspect, the present invention is a composition comprising a poly(hydroxy aminoether) and an effective amount of a propoxylated or ethoxylated phenol.

As used herein, the term "propoxylated or ethoxylated phenol" refers to a phenol that has been reacted with ethylene oxide, propylene oxide, or a combination of ethylene oxide and propylene oxide.

As used herein, the term "effective amount" refers to the amount of propoxylated or ethoxylated phenol which is sufficient to improve the adhesion of the poly(hydroxy amino ether) to substrates.

It has been found that the propoxylated or ethoxylated phenol modifier does not react with the hydroxy functionalized poly (amino ether), nor does it increase the water absorptivity of the modified resin. The propoxylated or ethoxylated phenols only moderately depress the glass transition temperature of the modified resin, thus retaining the processability of the modified resin. The modified polyhydroxy (amino ether) of the present invention has low viscosity at a low shear rate, which improves its adhesion to substrates.

BRIEF DESCRIPTION OF THE DRAWING

FIG. 1 shows the relationship between the amount of modifier and the viscosity of the resultant blend.

DETAILED DESCRIPTION OF THE INVENTION

Preferably, the poly(hydroxy amino ether) has repeating units represented by the formula:

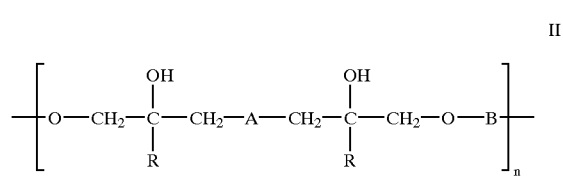

wherein R is alkyl or hydrogen; A is a diamino moiety or a combination of different amine moieties; B is a divalent organic moiety which is predominantly hydrocarbylene; and n is an integer from 5 to 1000.

The term "predominantly hydrocarbylene" means a divalent radical which is predominantly hydrocarbon, but which optionally contains a minor amount of heteroatomic moiety such as oxygen, sulfur, imino, sulfonyl, and sulfoxyl.

In the preferred embodiment of the present invention, R is hydrogen; and A is 2-hydroxyethylimino, 2-hydroxypropylimino, piperazenyl or N,N'-bis(2-hydroxyethyl)-1,2-ethylenediimino.

The poly(hydroxy amino ethers) or polyetheramines are prepared by contacting one or more of the diglycidyl ethers of a dihydric phenol with a difunctional amine (an amine having two amine hydrogens) under conditions sufficient to cause the amine moieties to react with epoxy moieties to form a polymer backbone having amine linkages, ether linkages and pendant hydroxyl moieties. These polyetheramines are described in U.S. Pat. No. 5,275,853, incorporated herein by reference. The polyetheramines can also be prepared by contacting a diglycidyl ether or an epihalohydrin with a difunctional amine.

The propoxylated or ethoxylated phenols which can be employed in the practice of the present invention include propoxylated-ethoxylated bisphenol A which is commercially available as SYN FAC™ 8031 from Milliken Chemical, USA and described in U.S. Pat. No. 4,507,461. Other propoxylated or ethoxylated phenols which can be employed in the practice of the present invention include those described in U.S. Pat. Nos. 6,111,146 and 5,786,514, incorporated herein by reference.

While the amount of propoxylated or ethoxylated phenol used depends on a variety of factors, including the specific polymer employed and the desired end uses of the composition, in general, the propoxylated or ethoxylated phenol can be present in an amount of from about 0.1 to about 50 weight percent, preferably from about 2 to about 30 weight percent and, most preferably, from about 5 to about 15 weight percent, based on the total weight of the polyetheramine and propoxylated or ethoxylated phenol.

FIG. 1 shows there is a clear correlation between the amount of propoxylated or ethoxylated phenol (modifier) and the viscosity of the resultant blend.

Various additives may be incorporated into the composition of the invention in order to modify certain properties thereof. Examples of such additives include catalysts, plasticizers, wetting agents and colorants.

In general, the poly(hydroxy amino ether) (PHAE) composition can be prepared by mixing the poly(hydroxy aminoether) and the propoxylated phenol in a processing equipment, such as a HAAKE™ mixer for a time sufficient to provide a well blended mixture of the components.

The PHAE composition can be used in applications such as films, fibers, adhesives and injection molding applications where increased polymer flow is desirable. In addition, the reduced melt viscosity of the polymer blend may facilitate the incorporation of the composition into solutions or into aqueous, waterborne or other solvent-based dispersions.

The following examples are given to illustrate the invention and should not be construed as limiting its scope. All parts and percentages are by weight unless otherwise indicated.

EXAMPLE 1

Polyhydroxyaminoether (BLOX™ 220), EA-275 (polyethylenepolyamines) and Resin 565 (Dow trade designation of a diether of propylene glycol and bisphenol A) were mixed in a HAAKE™ mixer at a temperature and time sufficient to provide a well blended mixture of the components.

TABLE 1

Composition and glass transition temperature of Blox 220-Resin 565 blends

| Run | Composition | BLOX 220, g | EA-275, g | Resin 565, g | Tg, ° C. |
|---|---|---|---|---|---|
| 1 | Blox 220 + 1% EA-275 | 59.40 | 0.60 | 0.00 | 75 |
| 2 | Blox 220 + 1% EA-275) 90%, Resins 565 10% | 53.46 | 0.54 | 6.00 | 67 |
| 3 | (Blox 220 + 1% EA-275) 93%, Resins 565 7% | 55.24 | 0.56 | 4.20 | 68 |
| 4 | (Blox 220 + 1% EA-275) 95%, Resins 565 5% | 56.43 | 0.57 | 3.00 | 69 |
| 5 | (Blox 220 + 1% EA-275) 97%, Resins 565 3% | 57.62 | 0.58 | 1.80 | 70 |
| 6 | (Blox 220 + 1% EA-275) 99%, Resins 565 1% | 58.81 | 0.59 | 0.60 | 75 |

EXAMPLE 2

Polyhydroxyaminoether (BLOX™ 220), EA-275 (polyethylenepolyamines) and SYN FAC™ 8031, a propoxylated-ethoxylated bisphenol A from Milliken Chemical, were mixed in a HAAKE™ mixer at 140° C. (metal temperature) and 50 rpm for 10 min according to the formulation listed in Table 2. Only one glass transition temperature was observed for each blend.

TABLE 2

Composition and glass transition temperature of Blox 220-Syn Fac 8031 resin blends

| Run | Composition | BLOX 220, g | EA-275, g | Syn Fac 8031, g | Tg, ° C. |
|---|---|---|---|---|---|
| 1 | (Blox 220 + 1% EA-275) 90%, Syn Fac 8031 10% | 53.46 | 0.54 | 6.00 | 57 |
| 2 | (Blox 220 + 1% EA-275) 93%, Syn Fac 8031 7% | 55.24 | 0.56 | 4.20 | 63 |
| 3 | (Blox 220 + 1% EA-275) 95%, Syn Fac 8031 5% | 56.43 | 0.57 | 3.00 | 68 |
| 4 | (Blox 220 + 1% EA-275) 97%, Syn Fac 8031 3% | 57.62 | 0.58 | 1.80 | 69 |
| 5 | (Blox 220 + 1% EA-275) 99%, Syn Fac 8031 1% | 58.81 | 0.59 | 0.60 | 73 |

EXAMPLE 3

Sheath-core bicomponent fibers were produced from a Blox 220 resin containing 5 weight percent of Synfac 8031 additive (sheath) and a polypropylene (core). Fibers produced from this blend had a sheath component with an appropriate combination of melt strength and low viscosity such that fibers could be spun and drawn at 215° C. Spin conditions are given in Table 3.

TABLE 3

| GENERAL | "A" EXTRUDER (SHEATH) | "B" EXTRUDER (CORE) |
|---|---|---|
| Polymer Type | Blox 220 resin with 5% modifier | Polypropylene |
| Volume Ratio | 20 | 80 |
| Extrusion Temps., ° C. | Setpoint (Observed) | |
| Zone 1 | 165 (165) | 205 (205) |
| Zone 2 | 170 (172) | 210 (211) |
| Zone 3 | 180 (180) | 215 (215) |
| Zone 4 | 190 (190) | 220 (220) |
| Melt Temp., ° C. | 200 | 223 |
| Spin Head Temp., ° C. | 220 (223) | 220 (223) |

The resultant fibers had a tenacity of 2.8 grams per denier.

What is claimed is:

1. A composition comprising a poly(hydroxy aminoether) and an effective amount of a propoxylated or ethoxylated phenol to improve the adhesion of the poly(hydroxy amino ether) to substrates.

2. The composition of claim 1 wherein the poly(hydroxy aminoether) has repeating units represented by the formula:

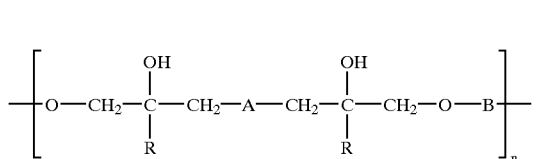

II wherein R is alkyl or hydrogen; A is a diamino moiety or a combination of different amine moieties; B is a divalent organic moiety which is predominantly hydrocarbylene; and n is an integer from 5 to 1000.

3. The composition of claim 1 wherein the propoxylated or ethoxylated phenol is a bisphenol A that has been reacted with propylene oxide and/or ethylene oxide.

4. The composition of claim 1 wherein the propoxylated or ethoxylated phenol is present in an amount of from 0.1 to 50 weight percent, based on the total weight of the poly(hydroxy aminoether) and propoxylated or ethoxylated phenol.

5. The composition of claim 4 wherein the propoxylated or ethoxylated phenol is present in an amount of from 2 to 30 weight percent, based on the total weight of the poly(hydroxy aminoether) and propoxylated or ethoxylated phenol.

6. The composition of claim 5 wherein the propoxylated or ethoxylated phenol is present in an amount of from 5 to 15 weight percent, based on the total weight of the poly(hydroxy aminoether) and propoxylated or ethoxylated phenol.

7. A method for preparing a composition comprising a poly(hydroxy amino ether) (PHAE) and a propoxylated or ethoxylated phenol which comprises adding an effective amount of a propoxylated or ethoxylated phenol to the PHAE to improve the adhesion of the PHAE to substrates.

8. The method of claim 7 wherein the propoxylated or ethoxylated phenol is present in an amount of from 0.1 to −50% weight percent, based on the total weight of the PHAE and propoxylated or ethoxylated phenol.

9. Articles, fibers, dispersions, solutions, films and molded parts comprising the composition of claim 1.

* * * * *